United States Patent [19]
Hehl

[11] Patent Number: 6,109,904
[45] Date of Patent: Aug. 29, 2000

[54] MOULD CLOSURE UNIT WITH A DEVICE FOR REMOVING INJECTION MOULDINGS

[76] Inventor: Karl Hehl, Arthur-Hehl-Strasse 32, D-72290 Lossburg, Germany

[21] Appl. No.: 09/043,938

[22] PCT Filed: Sep. 13, 1996

[86] PCT No.: PCT/DE96/01767

§ 371 Date: Apr. 2, 1998

§ 102(e) Date: Apr. 2, 1998

[87] PCT Pub. No.: WO97/12741

PCT Pub. Date: Apr. 10, 1997

[30] Foreign Application Priority Data

Oct. 2, 1995 [DE] Germany .................... 195 36 567

[51] Int. Cl.[7] ............... B29C 45/17; B29C 45/42
[52] U.S. Cl. ............ 425/190; 425/192 R; 425/556; 425/577
[58] Field of Search ................. 425/190, 192 R, 425/556, 577, 589, 444

[56] References Cited

U.S. PATENT DOCUMENTS 4,645,446 2/1987 Hehl ........................ 425/556

5,585,126 12/1996 Heindl et al. ............. 425/589
5,711,971 1/1998 VanderSanden ........... 425/190

FOREIGN PATENT DOCUMENTS

| 0 320 621 | 6/1989 | European Pat. Off. . |
| 19 62 663 | 1/1979 | Germany . |
| 82 33 362 | 2/1986 | Germany . |
| 42 28 140 | 3/1994 | Germany . |
| 44 09 822 | 8/1995 | Germany . |

*Primary Examiner*—James P. Mackey
*Attorney, Agent, or Firm*—Venable; Gabor J. Kelemen

[57] ABSTRACT

A mold closing unit is provided with a device for handling and/or removal of moldings, comprising a supporting element for supporting the device in the area of the mold, an actuating element, by which handling element penetrating into the mold cavity is operable, as well as a drive unit for driving the actuating element. The drive unit drives the actuating element electromechanically and at least drive unit, supporting element and actuating element constitute structural unit which is detachable from the mold closing unit. The drive unit is a hollow shaft motor at least partially receiving the actuating element.

11 Claims, 8 Drawing Sheets

MOULD CLOSURE UNIT WITH A DEVICE FOR REMOVING INJECTION MOULDINGS

CROSS REFERENCE TO RELATED APPLICATIONS

The present application claims the priority of German Patent Application 195 36 567.4, filed on Oct. 2, 1995, the disclosure contents of which is herewith also explicitly made the subject matter of the present application.

TECHNICAL FIELD

The invention concerns a mold closing unit comprising a device for handling and/or removal of injection moldings wherein there is provided a stationary mold carrier; a movable mold carrier displaceable towards and away from the stationary mold carrier; a mold clamping space formed between the movable and stationary mold carriers and adapted for receiving a mold comprising a mold cavity for manufacture of moldings; a supporting element supporting the device at the mold closing unit; the device including a handling element actuatable for penetrating linearly into the mold to the mold cavity when handling or removal of moldings is required; an actuating element for actuating the handling element; and an electromechanical drive unit for driving the actuating element, wherein the drive unit, the supporting element and the handling unit comprise a structural unit which is independently detachable from the mold closing unit.

PRIOR ART

Such a mold closing unit comprising a device for handling and/or removal of moldings constituted as a structural unit and having multiple uses is known from DE 42 28 140 A1. It can be tested at the customer's company with regard to its operatability before the device is installed and can be transferred from machine to machine, if the customer should require it. For this purpose the unit has only to be connected to a corresponding connection component in the area of the mold of the injection molding machine and to a mains supply. The device is driven via an electromotor as for example a gear motor, so that a triggering via a spur gear takes place. This not only involves an additional expenditure, but means that in the space already required for the mold closing device of the mold closing unit, space for arranging the gear motor and the gear has to be provided, if an ejector is applied. This makes it more difficult to transfer the device to different machines and in some cases even impossible.

From DE 44 09 822 A1, a planetary-rolling-thread-spindle drive is known, which makes possible an extremely precise triggering of the ejector. In this spindle drive known as such from EP-B 320 621, planet rolls are provided, which on the side of the nut, mesh with rills of the nut and on the side of the spindle are in connection with the thread of the spindle. Through a rolling motion, thread pitches up to a range of 0.1 mm per each thread pitch are possible. Due to the rolling motion these drives have an extremely low noise level, although, a space-robbing separation between motor and drive is the consequence which is not desirable in the area of the ejector.

In the field of electro mechanical machines, electrical devices are also known for handling and/or removal of moldings from the injection mold. These known devices mostly have a problem that they cannot work sufficiently precise or that not enough space for the ejectors is at disposal, since when electromotors are applied, a rotational movement always has to be converted into a linear movement. The linearly moved element of the drive then, however, needs a corresponding space at the injection molding machine. In this field, however, it is unusual to use the same element as ejector-, core drawback- and unscrewing-device.

A mold closing unit is known for example from DE 82 33 362 U1 for hydraulically working machines. This device serves as an ejector for ejecting the moldings manufactured in an injection molding process. The ejector units or alternatively core drawback- or unscrewing devices (DE 19 62 663 B2) required therefor, however, are because of space reasons, arranged fixedly in the area of the mold closing unit and are not displaceable.

SUMMARY OF THE INVENTION

Based on this state of the art, it is an object of the invention to create a space-saving, electromechanically working device for handling and/or removal of moldings, which is multiply usable as an independant, operative unit.

The above and other objects are accomplished according to the invention by the provision of a combination of a mold closing unit and a device for handling and/or removal of moldings from an injection molding machine for processing plastifiable materials, comprising: a stationary mold carrier; a movable mold carrier displaceable towards and away from the stationary mold carrier; a mold clamping space formed between the movable and stationary mold carriers and adapted for receiving a mold comprising a mold cavity for manufacture of moldings; a supporting element supporting the device at the mold closing unit in an area of the mold; the device including a handling element actuatable for penetrating linearly into the mold to the mold cavity when handling or removal of moldings is required; an actuating element for actuating the handling element; and an electromechanical drive unit including a hollow shaft motor at least partially receiving the actuating element for driving the actuating element, wherein the drive unit, the supporting element and the handling unit comprise a structural unit which is independently detachable from the mold closing unit.

According to the invention, a hollow shaft motor is used, as the driver and receives at least partially the actuating element, which preferable is a spindle. The use of a hollow shaft motor in the area of the ejector has the advantage that it can be constructed in an extremely space-saving manner, since no additional elements for the conversion of the rotational movement into a linear movement outside the hollow shaft motor are required. In the area of the closing mechanism, where it is important to transfer the force of the closing device as full face or flush as possible to the movable mold carrier, the hollow shaft motor can trigger the ejector directly. Since the ejector, does not need now to be arranged in line with the closing unit, the mold closing unit and thus the injection molding machine is reduced in length. Even in case of an arrangement in line with the closing device, the structural shape is still shorter compared to that of other known ejectors. Thus, utilizing the princples of the invention, the whole injection molding machine can be more compact and favorable.

DETAILED DESCRIPTION OF THE PREFERRED EMBODIMENT

The invention will now be described in more detail by example with reference to the figures. The embodiments are merely examples and are not intended to limit the inventive concept to any particular physical configuration.

Figure 1:
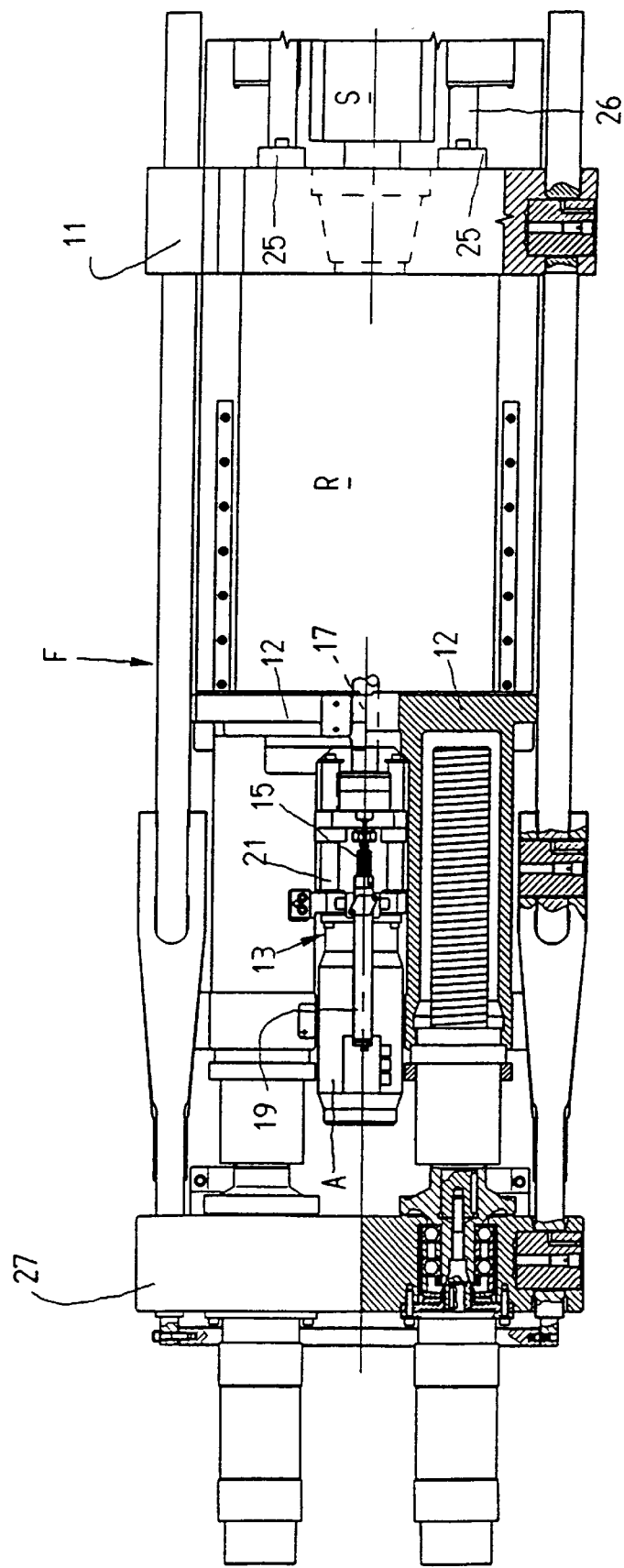
FIG. 1 a top view on an injection molding machine in the area of the mold closing unit, FIG. 2 a side view of a device for handling and/or removal of moldings, FIG. 3 a top view of the device according to FIG. 2, FIG. 4 a view of the movable mold carrier plate, with the closing unit is in section, FIG. 5 an illustration according to FIG. 2 showing a direct fixing of the device at the mold carrier, FIG. 6 a side view of an arrangement of the device on the injection molding side, FIG. 7 a top view on the arrangement according to FIG. 6, FIG. 8 a side view on a mold closing unit comprising two devices fixed thereon.

FIG. 1 shows a partial view of an injection molding machine for processing plastifiable masses, powdery masses or ceramic masses, wherein mostly it is useful as a plastics injection molding machine. In this device a mold clamping space R is created between a stationary mold carrier 11 and a movable mold carrier 12, which is displaceable via a closing unit. Molds M comprising a mold cavity 14 for manufacturing moldings 10 are introduced into this mold clamping space. For this purpose an injection molding unit S, which injects the plastifiable material into the mold cavity, is arranged at the stationary mold carrier 11 or in the parting plane. In order to generate the closing force, the closing unit is supported at a supporting element 27. Between supporting element 27 and movable mold carrier 12, preferably in the center of the injection axis, a space is provided for arrangement of an ejector, a core drawback or an unscrewing mechanism which are described below as constituted by a device 13 for handling and/or removal of moldings.

Figure 2:
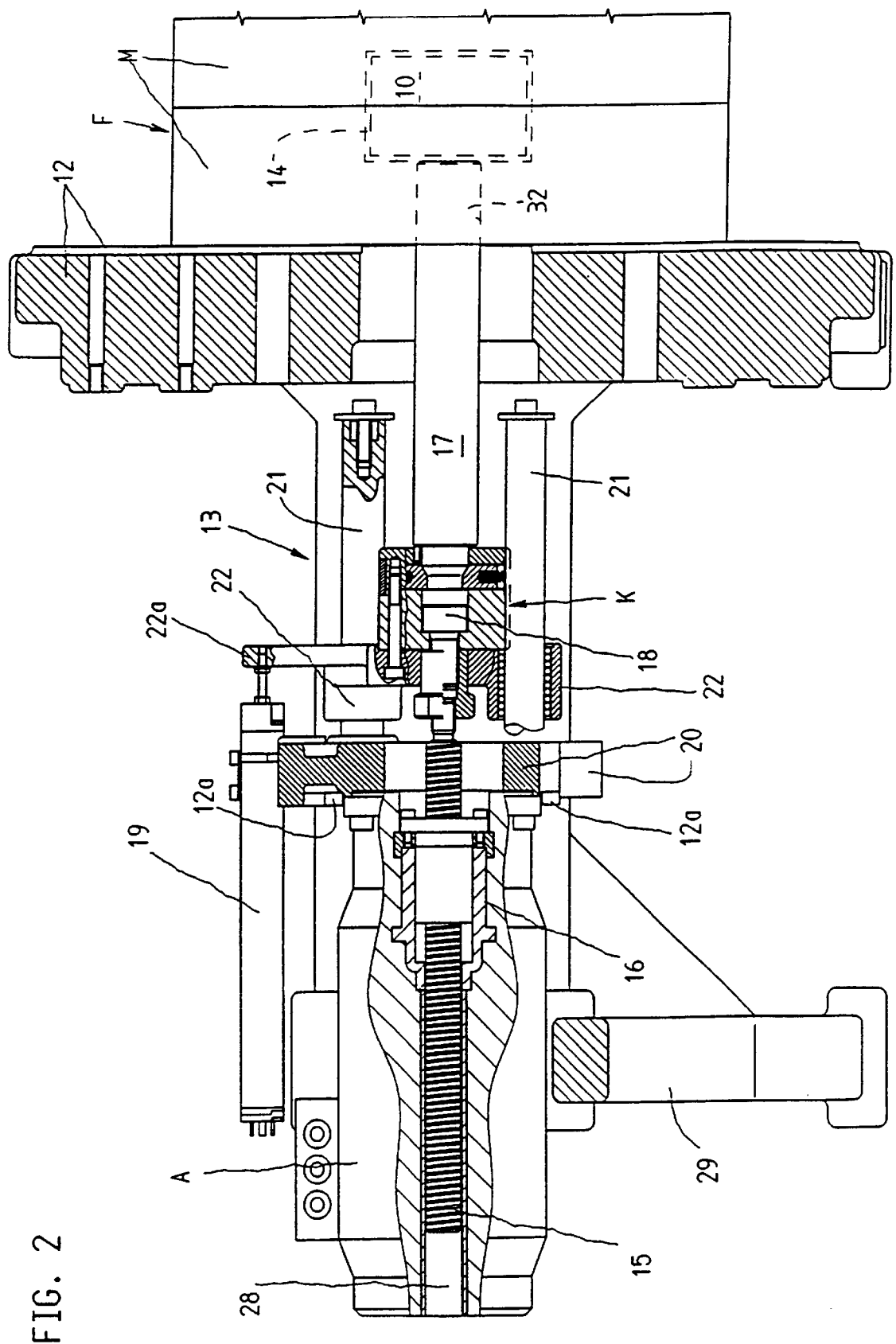
Figure 3:
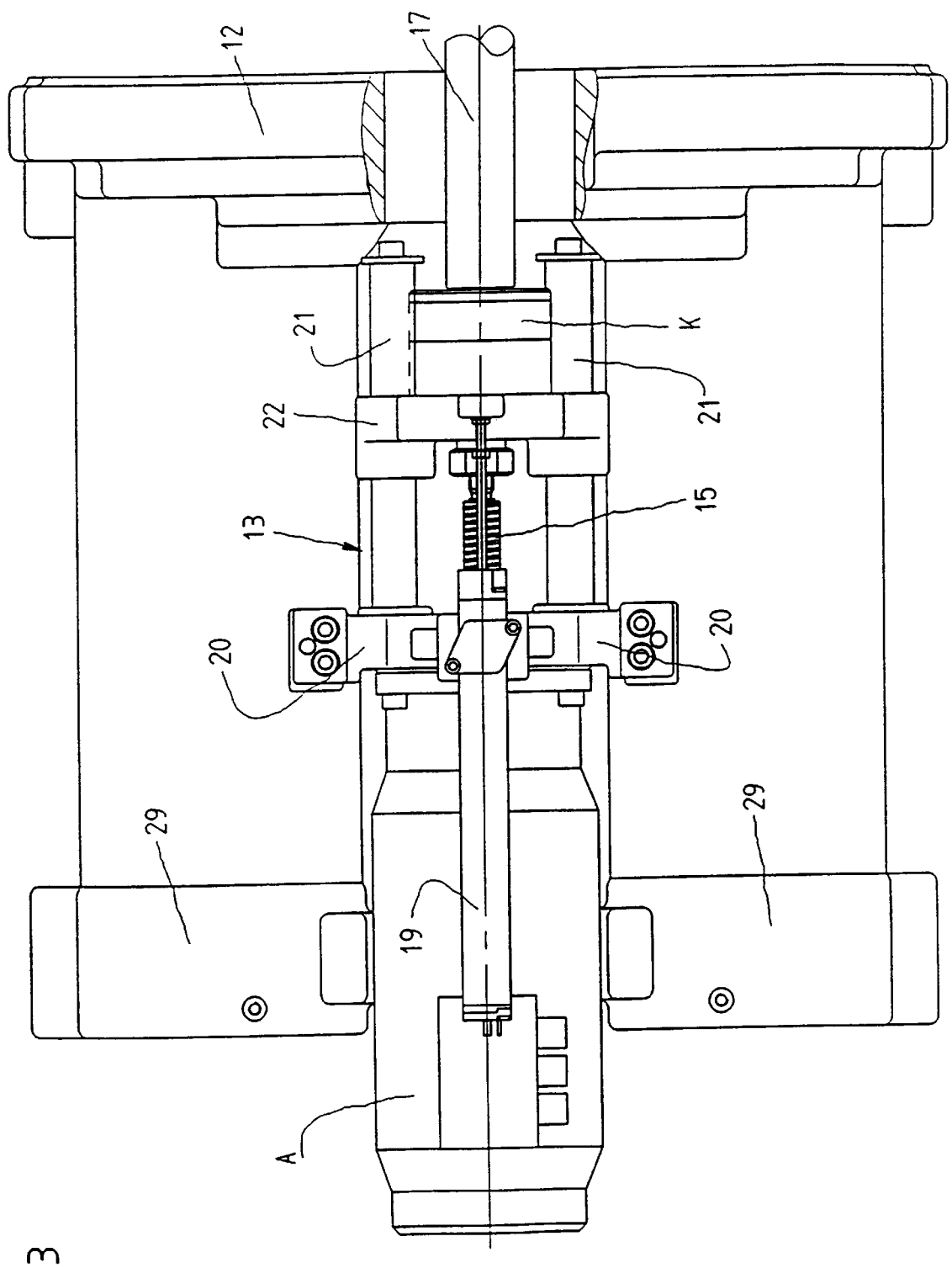

FIG. 2 shows such a device. The device 13 has an actuating element, which is illustrated in the form of a spindle 15, by which a handling element (ejector) 17 penetrating linearly into the mold M to the mold cavity 14 is actuable. In order to make possible this penetration, the movable mold carrier as illustrated in FIG. 2 is provided with a bore hole 12 and the mold M has a bore hole 32. The handling element is attached to the wall of the mold cavity 14, in order to have access to the molding 10 on one side and for, if possible, not being perceptive to vision at the molding 10 after this has been finished. Such a device 13 is only used, when the corresponding mold M requires it. The device 13 supports itself in the area of the mold, that means at the mold itself, at the stationary mold carrier or at the movable mold carrier.

Electromechanical drive unit A for the spindle 15 is provided in the form of a space-saving hollow shaft motor. The whole device is so designed, that at least the drive unit A, the supporting element 27 and the actuating element 15 constitute a structural unit closed in itself and detachable as an independant unit from the mold closing unit F. This structural unit is transferable as often as desired,if the corresponding connections are provided at the injection molding machine on the one hand for mechanical connection of the device 13 and on the other hand for connection to the power supply. Different connections can be distributed across the machine in the area of the mold M, which then can be triggered on the control side via a corresponding interface.

The structural unit has coupling means 18 (see example, FIG. 2) by which the spindle 15 is couplable as the actuating element to the handling element 17. This has the advantage that corresponding ejectors can be exchanged with the mold or that the handling elements according to their task as ejectors, core drawbacks or unscrewing mechanisms can be exchanged. A path measuring device 19 is connected with the structural unit, for example in the form of a linear potentiometer. The drive unit A can be regulated or controlled by the signals of this path measuring device 19.

According to FIG. 2 the drive unit A is placed at a distance from the mold M. The drive unit, in this case due to reasons of space, a hollow shaft motor, is flanged to a retaining plate 20. In the embodiment of FIG. 2 the fixing of the retaining plate 20 is made at a formed on element 12a of the movable mold carrier.

Figure 5:
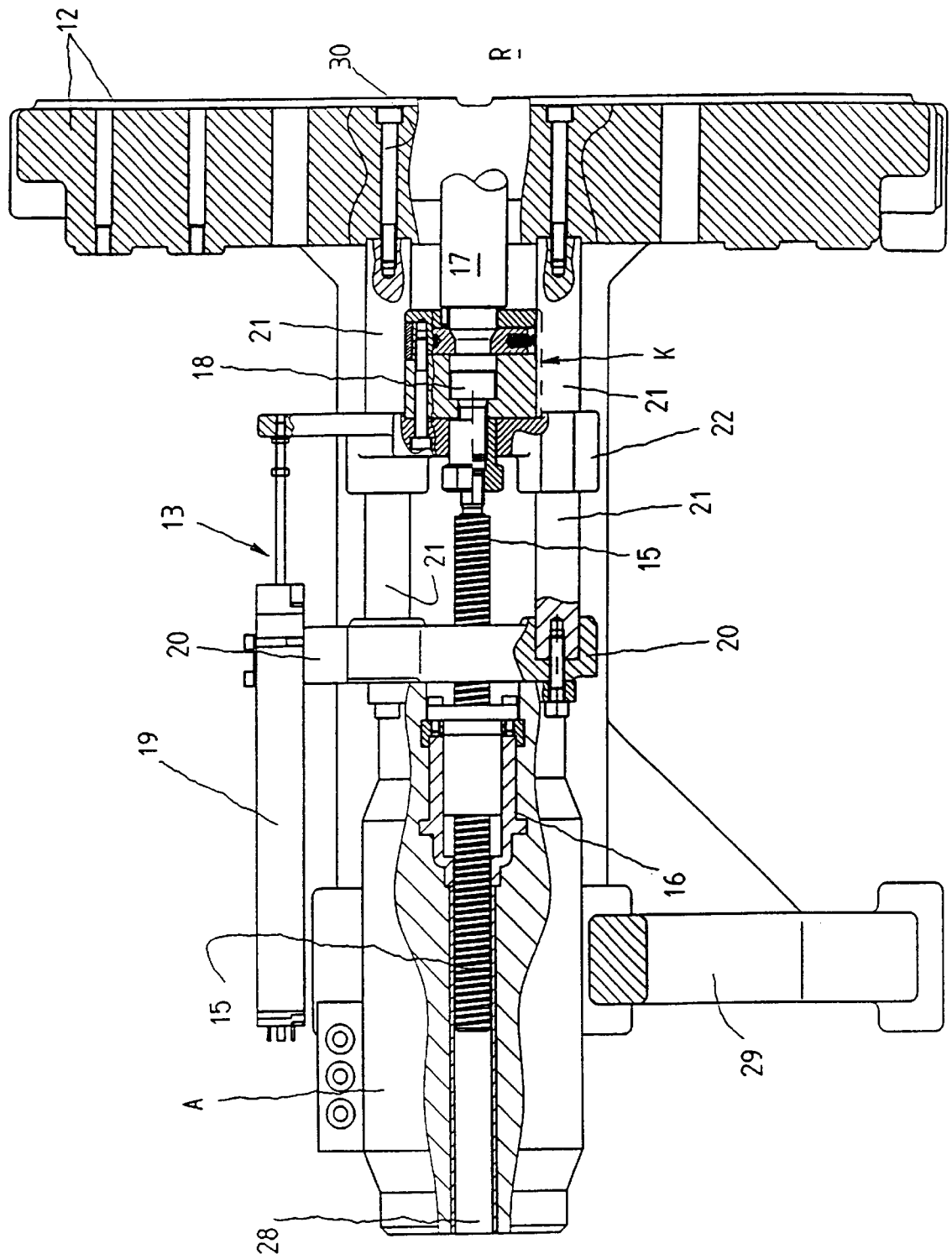
Figure 6:
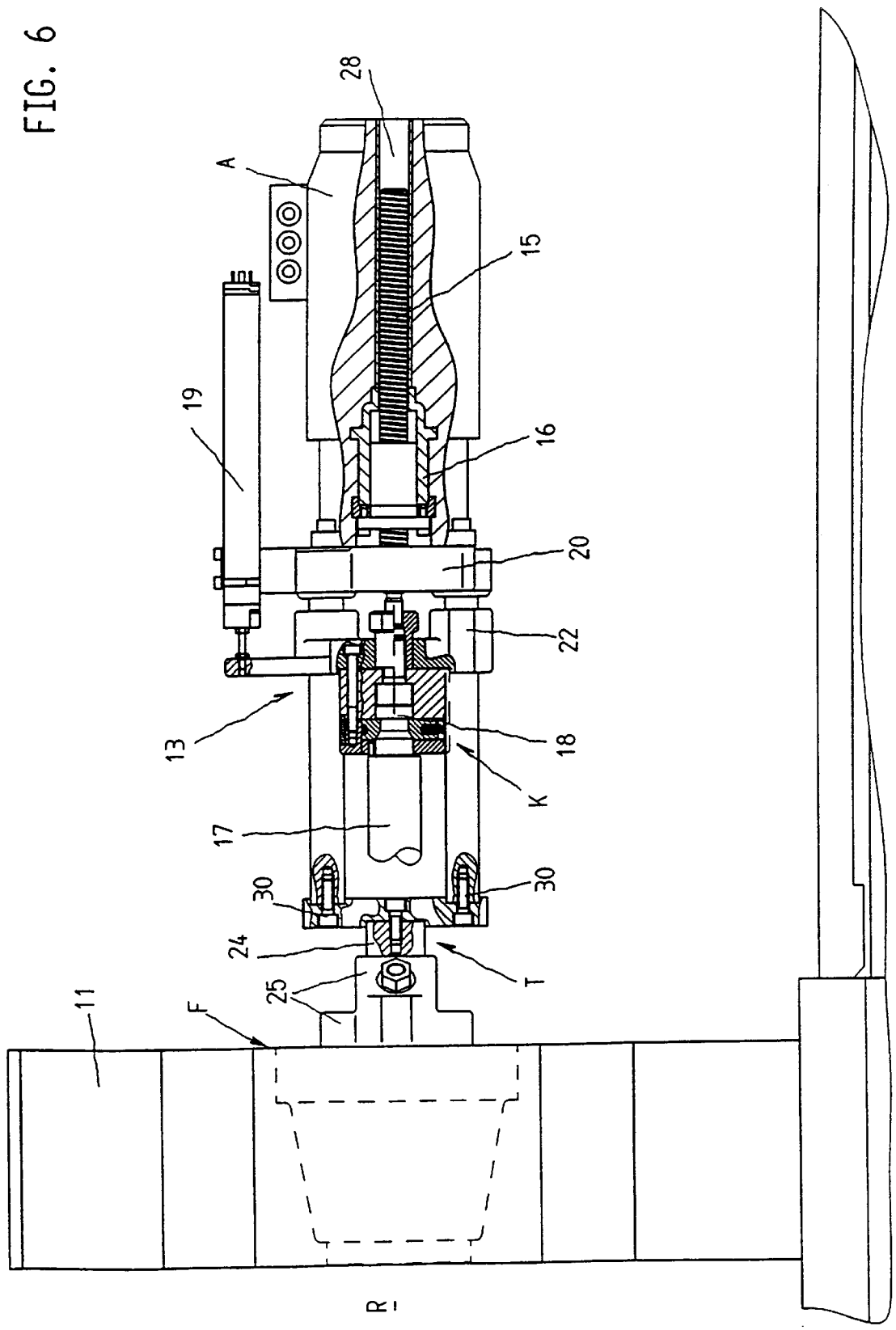
Figure 7:
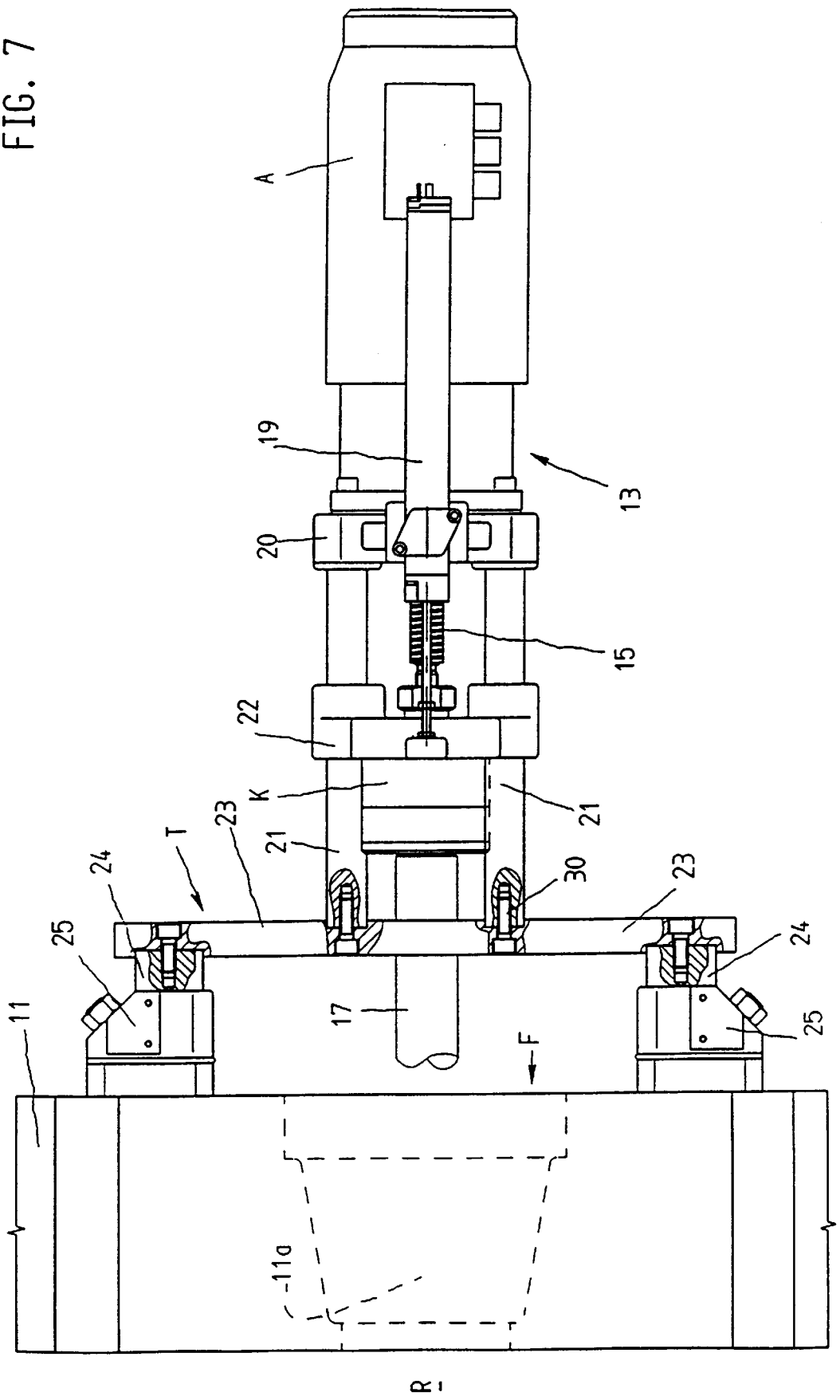

An alternative embodiment is shown in FIG. 5. There the motor is flanged to a retaining plate 20, however, the studs 21 are fixed directly at the movable mold carrier via fixing means 30. This fixing method makes easier the displacement of the device 13, for example into the position according to FIG. 7 and 8.

Figure 4:
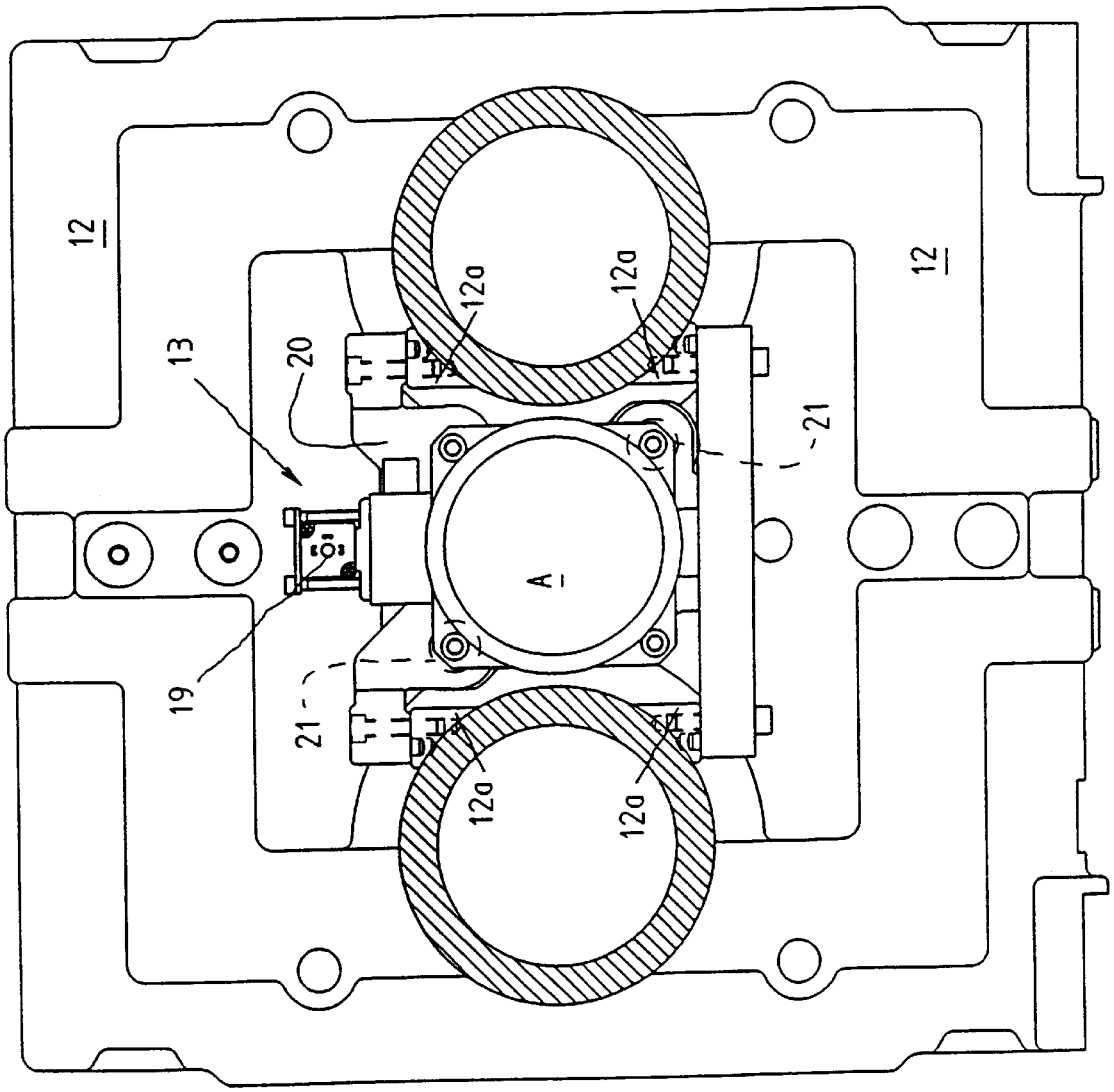

In the illustrated embodiment, the drive unit is a spindle drive. As spindle drives, for example, roll spindle drives, ball roll spindle drives, rolling drives or planetary-roll-thread-spindle drives can be taken into consideration. In the area of the hollow shaft motor planetary gears can be integrated. If the spindle 15 is actuated, it moves inside the hollow shaft motor, for which a recess 28 is provided there. In the embodiments the spindle 15 is fixed secured against turning at a bearing 22, whilst the nut 16 rotates. The bearing 22 also makes sure, that the spindle 15 remains secure against turning. According to FIG. 4 at least two of the studs 21 are at the same time formed as guide columns, on which the bearing 22 slides. The bearing 22 additionally has a formed on element 22a, which makes possible the connection to the path measuring device 19. At the bearing 22 also the coupling area K for the coupling means 18 for coupling the handling element 17 is arranged.

If a planetary-rolling-thread-spindle drive is provided as the spindle drive, the spindle drive can be triggered very precisely. In this drive mode planet rolls are provided between nut 16 and spindle 15, which with its different outer diameters sit close to rills of the nut 16 and at the thread of the spindle 15. Low thread pitches and high force transformation can thus be realized and in addition the drive is of low noise.

Since the device 13 comprises a structural unit, it is easily displaceable in the area of the mold closing unit and can be arranged, for example, at the stationary mold carrier without problems. An extremely advantageous arrangement results, if the device 13 in this case emulates the injection molding unit S, which in this kind of arrangement usually is in the parting plane, in order to carry out a direct injection into the parting plane. For this purpose the device 13 is connected to a transverse bar 23 (see FIG. 7) via fixing means 30. At the transverse bar 23 rod-like components 24 are arranged, which are fixable in connection members 25, usually provided for the fixing of the guide rods 26 of the injection molding unit S. The device 13 is arranged in such a way, that it lies in the injection axis, so that it can penetrate into the mold clamping space R through the injection orifice 11a of the stationary mold carrier.

Figure 8:
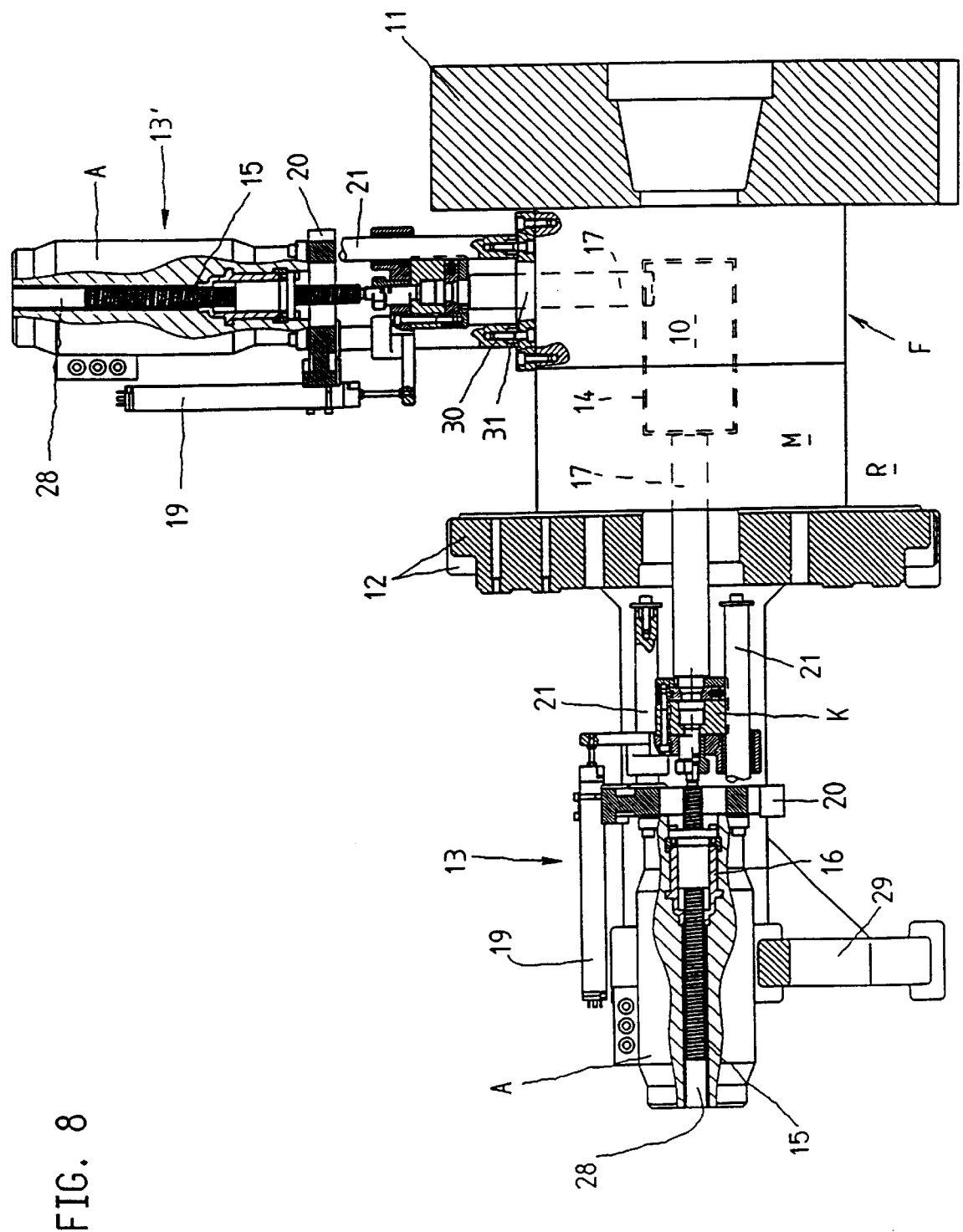

FIG. 8 makes clear the advantage of the modular concept obtained with respect to the device 13. On the one hand a device 13 can be arranged as usual at the movable mold carrier 12. In case of corresponding moldings 10 it is possible to arrange a further device 13' at the same time at the mold M for example. The two devices in the present case merely differ from each other in that for the device 13' an embodiment according to FIG. 5 has been chosen, so that a fixing of the studs 21 to the mold is made via the fixing means 30. The fixing means 30 are in connection with a fixing plate 31, which itself is fixed at the mold M.

The devices 13 can easily be adapted to different intended purposes. If it works as ejector or core drawback, it is not necessary, that the handling element 17 rotates. It is different, however, if the device 13 is required as an unscrewing mechanism for unscrewing moldings provided with a thread. In this case the spindle 15 should rotate. This is made possible by using the nut 16 as a coupling to the spindle 15 via a set screw. A guide thread then provides for the necessary advance. Basically it is possible that the spindle rotates, if only a corresponding pivot bearing is provided in the area of the bearing 22.

Thus the device is constructed in a modular way and designed electrically ready to plug including the path measuring device 19. Through the studs 21 formed as guide rods the structural unit bears itself. By this it can be transferred without problems from machine to machine. At the same time it is also usable as a core drawback unit. The construction makes possible to maintain the full force over the whole stroke at constant speed. Nevertheless, due to its modular construction, the device 13 is for example also usable in hydraulic machines.

It is self-evident, that this description can be subject to different modifications, changes and adjustments, ranging within the area of equivalents of the annexed claims.

What is claimed is:

1. A combination of a mold closing unit and a device for handling and/or removal of moldings from an injection molding machine for processing plastifiable materials, comprising:

a stationary mold carrier;

a movable mold carrier displaceable towards and away from the stationary mold carrier;

a mold clamping space formed between the movable and stationary mold carriers and adapted for receiving a mold comprising a mold cavity for manufacture of moldings;

a supporting element supporting the device at the mold closing unit in an area of the mold;

the device including a handling element actuatable for penetrating linearly into the mold to the mold cavity when handling or removal of moldings is required;

an actuating element for actuating the handling element;

an electromechanical drive unit including a hollow shaft motor at least partially receiving the actuating element for driving the actuating element, wherein at least the drive unit, the supporting element and the actuating element form a structural unit which is independently detachable from the mold closing unit.

2. The combination according to claim 1, wherein the structural unit includes a path measuring device for producing signals which are useable to regulate the drive unit.

3. The combination according to claim 1, wherein the supporting element comprises a retaining plate at which the drive unit is fixed, and the combination further includes studs arranged to maintain the retaining plate at a distance from the mold.

4. The combination according to claim 3, wherein the drive unit is fixable at the movable mold carrier via the studs.

5. The combination according to claim 3, wherein the drive unit is fixable at the stationary mold carrier via the studs.

6. The combination according to claim 3, further comprising means for coupling the actuating element to the handling element in a coupling area; and a bearing guided on the studs for guiding a linear movement of the actuating element.

7. The combination according to claim 1, wherein the structural unit is fixed at the stationary mold carrier.

8. The combination according to claim 7, further including connection components arranged at the stationary mold carrier for fixing guide rods of an injection molding unit, and a supporting arrangement for fixing the structural unit to the connection components, and wherein the actuating element penetrates into the mold clamping area through an injection orifice in the stationary mold carrier.

9. The combination according to claim 1, wherein the device comprises an unscrewing device and the drive unit includes a rotatable spindle.

10. The combination according to claim 1, wherein the device comprises a core drawback device.

11. The combination according to claim 1, wherein the device comprises an ejector.

* * * * *